(12) United States Patent
Gopalakrishnan (10) Patent No.: US 11,025,561 B2
(45) Date of Patent: Jun. 1, 2021

(54) SYSTEMS AND METHODS FOR COMPUTING INFRASTRUCTURE RESOURCE ALLOCATION

(71) Applicant: Walmart Apollo, LLC, Bentonville, AR (US)

(72) Inventor: Murali Krishna Gopalakrishnan, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 154 days.

(21) Appl. No.: 16/130,002

(22) Filed: Sep. 13, 2018

(65) Prior Publication Data

US 2019/0081907 A1 Mar. 14, 2019

Related U.S. Application Data

(60) Provisional application No. 62/557,873, filed on Sep. 13, 2017.

(51) Int. Cl.
| | |
|---|---|
| *H04L 12/927* | (2013.01) |
| *H04L 12/915* | (2013.01) |
| *H04L 12/911* | (2013.01) |
| *H04L 12/24* | (2006.01) |
| *G06F 9/455* | (2018.01) |

(Continued)

(52) U.S. Cl.
CPC ........ *H04L 47/805* (2013.01); *G06F 9/45558* (2013.01); *H04L 41/0823* (2013.01); *H04L 41/5054* (2013.01); *H04L 43/0817* (2013.01); *H04L 47/762* (2013.01); *H04L 47/786* (2013.01); *H04L 47/822* (2013.01); *G06F 2009/45583* (2013.01); *G06F 2009/45591* (2013.01)

(58) Field of Classification Search
CPC ....... G06F 9/45558; G06F 2009/45591; G06F 2009/45583; H04L 47/805; H04L 43/0817; H04L 47/786; H04L 47/822; H04L 41/5054; H04L 41/0823; H04L 47/762
See application file for complete search history.

(56) References Cited

U.S. PATENT DOCUMENTS

| | | | |
|---|---|---|---|
| 8,838,801 B2 | 9/2014 | Alapati et al. | |
| 2007/0280255 A1* | 12/2007 | Tsang | ................... H04L 47/801 370/395.2 |

(Continued)

OTHER PUBLICATIONS

International Search Report and Written Opinion for corresponding International Application No. PCT/US2018/050808 dated Nov. 26, 2018; 8 pages.

*Primary Examiner* — Philip C Lee
(74) *Attorney, Agent, or Firm* — Patterson Thuente Pedersen, P.A.

(57) ABSTRACT

Embodiments include a resource allocation system for managing execution of a computing task by a hierarchically-arranged computing infrastructure. In embodiments, the resource allocation system can comprise a resource map, an index processor, and an allocation manager. The resource map can include data elements that are associated with each service provider, including parent-child relationships. Workloads can be assigned to providers based on one or more optimization indexes calculated for each service provider based on a plurality of level-specific performance metrics received from one or more monitoring engines.

12 Claims, 6 Drawing Sheets

(51) Int. Cl.
*H04L 12/923* (2013.01)
*H04L 12/26* (2006.01)

(56) References Cited

U.S. PATENT DOCUMENTS

| | | | |
|---|---|---|---|
| 2008/0288739 A1* | 11/2008 | Bamba | G06F 9/5083 |
| | | | 711/172 |
| 2012/0221314 A1* | 8/2012 | Bourlatchkov | G06F 11/3409 |
| | | | 703/21 |
| 2014/0201218 A1 | 7/2014 | Catalano et al. | |
| 2014/0289412 A1 | 9/2014 | Doddavula et al. | |
| 2015/0067475 A1 | 3/2015 | Tuteja et al. | |
| 2015/0081883 A1 | 3/2015 | Katz et al. | |
| 2015/0170081 A1 | 6/2015 | Bothello et al. | |
| 2015/0277987 A1 | 10/2015 | Di Balsamo et al. | |
| 2016/0142338 A1* | 5/2016 | Steinder | H04L 41/0813 |
| | | | 709/226 |
| 2016/0337473 A1 | 11/2016 | Rao | |
| 2017/0177324 A1 | 6/2017 | Frank et al. | |

\* cited by examiner

SYSTEMS AND METHODS FOR COMPUTING INFRASTRUCTURE RESOURCE ALLOCATION

RELATED APPLICATION

The present application claims the benefit of U.S. Provisional Application No. 62/557,873 filed Sep. 13, 2017, which is hereby incorporated herein in its entirety by reference.

TECHNICAL FIELD

Embodiments of the present disclosure relate generally to the field of supply chain management.

BACKGROUND

In cloud computing environments, service models can be defined based on the capabilities provided to the subscriber at each level. At the highest level, Software as a Service (SaaS), the subscriber is given access to the provider's applications, generally through web browsers or application program interfaces (APIs). Platform as a Service (PaaS) models provide subscribers to deploy applications to a cloud infrastructure, including networks, servers, operating systems, or storage. At a low level, Infrastructure as a Service (IaaS) models enable the subscriber to provision processing, storage, networks, and other fundamental computing resources.

This stratification provides a number of benefits including the possibility of resource sharing. One infrastructure level service can support many platform services that, in turn, can support many applications. In practice, however, most cloud infrastructures still experience inefficiencies and scaling difficulties because resource needs are often unpredictable.

Commercial IaaS providers generally offer a number of price tiers tied to guaranteed hardware allocations. Subscribers to such services may pay a flat fee at a given tier, regardless of actual use or consumptions levels. Because the hardware layer (IaaS) is separated from the application layer (SaaS), an IaaS generally cannot monitor the application layer, or add tenants to a platform service that may have surplus capacity. Consumption rates can be improved at the platform level (for example, application deployment teams), if the application services add additional tenants to their available capacity. This is often not possible, because the platform level services are provisioned based on initial requests from application developers. These requests are often inflated, as application teams can often over-provision in order to handle peak loads, or simply request resources based on vendor recommendations, which are often based on the highest level their service would ever need.

Existing systems can be effective in monitoring utilization and consumption, but may lack the information to be proactive about low utilization. For example, a hypervisor can be oversubscribed by three occupants, but the utilization of each of the three occupants can be low. Another problem can arise when hardware (or other resources) is not being evenly utilized. Often, CPU capacity can be full on a given physical device, but memory may be available (or vice versa).

A need exists, therefore, for systems and methods to enable more efficient use of IaaS resources.

SUMMARY

Embodiments of the present disclosure provide a shared model enabling efficient use of previously provisioned IaaS resources. Embodiments include a resource allocation system for managing execution of a computing task by a hierarchically-arranged computing infrastructure. Embodiments of the resource allocation system can work with a computing infrastructure that includes a plurality of levels including a root level and a leaf level, each level including one or more service providers where each non-root level service provider is configured to consume a service provided by a parent service provider, and each leaf level service provider can be controlled to execute the computing task.

In embodiments, the resource allocation system can comprise a resource map, an index processor, and an allocation manager. The resource map can include data elements that are associated with each service provider, such that one or more ancestor service providers can be identified for each non-root level service provider.

The index processor can be configured to calculate an optimization index for each service provider based on a plurality of level-specific performance metrics received from one or more monitoring engines in data communication with each service provider including an aggregate of the optimization indexes of the one or more ancestor service providers of the leaf level service provider. The index processor can store the calculated optimization indexes in the resource map in association with the corresponding elements. In embodiments, the index processor can be further configured to periodically recalculate the optimization indexes.

The allocation manager can be configured to identify a leaf level service provider for execution of the computing task based on one or more task requirements and the resource map such that the optimization index for each leaf element is as close as possible to a target index value. In embodiments, the allocation manager can be further configured to create a new leaf level service provider for the computing task if no suitable leaf level service provider exists. In embodiments, the allocation manager can be configured to identify a replacement leaf level service provider for execution of the computing task by identifying one or more suitable replacement leaf level service providers and selecting the most closely related leaf level service provider.

In embodiments, a deployment manager can be configured to control each leaf service provider to execute one or more computing tasks based on the identified leaf service providers of a plurality of computing tasks.

In embodiments, the one or more monitoring engines comprise data connectors configured to store the plurality of level-specific performance metrics in a common metrics data store.

In embodiments, a method for allocating resources for execution of a computing task by a hierarchically-arranged computing can include storing a resource map comprising data elements associated with each service provider, such that one or more ancestor service providers can be identified for each non-root level service provider, calculating an optimization index for each service provider based on a plurality of level-specific performance metrics received from one or more monitoring engines in data communication with each service provider, calculating a branch index for each leaf level service provider based on an aggregate of the optimization indexes of the one or more ancestor service providers of the leaf level service provider, storing the calculated optimization indexes and branch indexes in the resource map in association with the corresponding elements, identifying a leaf level service provider for execution of the computing task based on one or more task requirements and the resource map such that the branch index for each leaf element is as close as possible to a target index value.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 1:
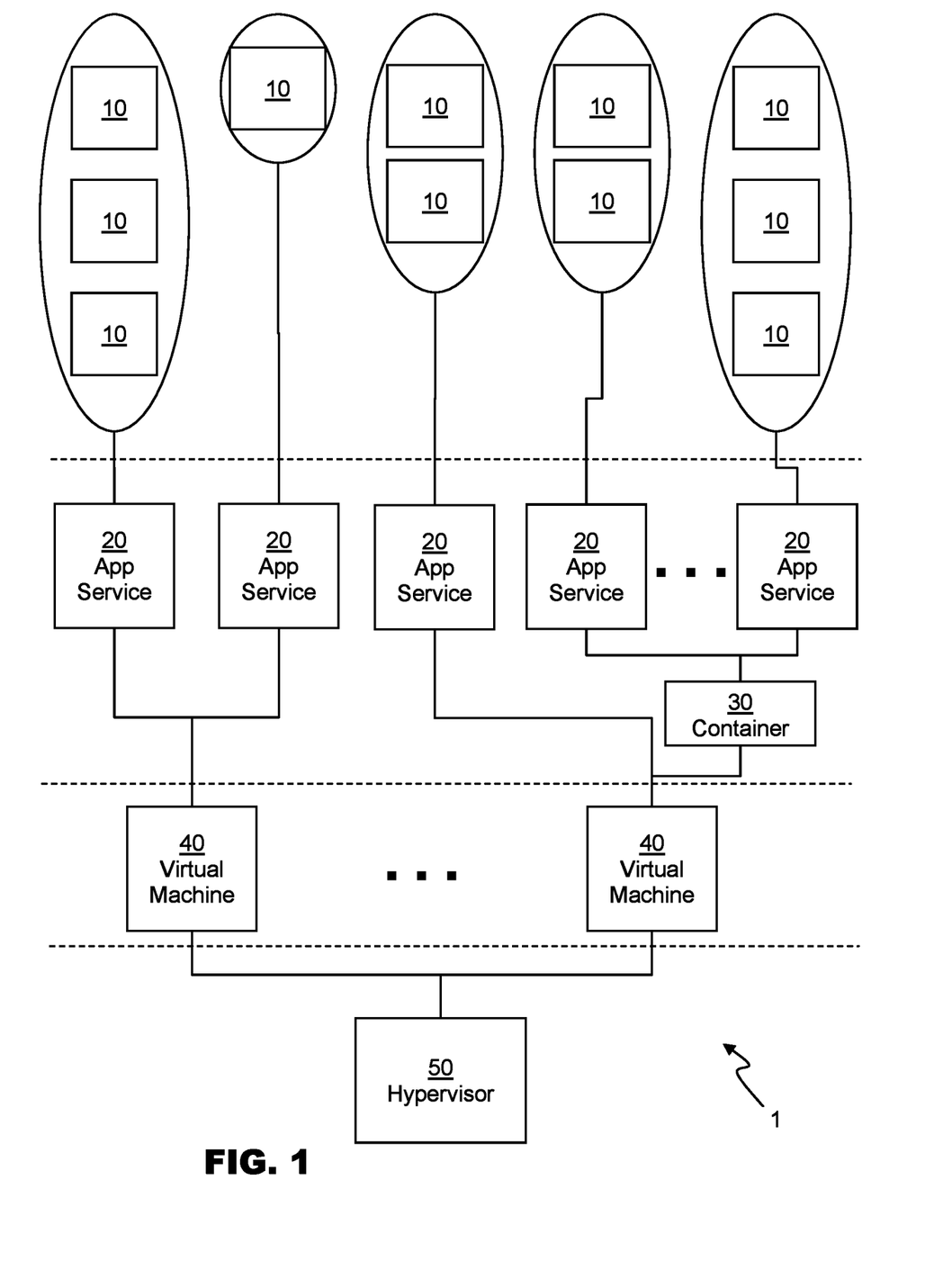
FIG. 1 is a block diagram depicting an example cloud infrastructure hierarchy, according to an embodiment.

Embodiments relate to a resource allocation system for a hierarchical cloud computing infrastructure. FIG. 1 is a block diagram depicting an example of a cloud computing infrastructure 1 that can be supported, in embodiments. As depicted, applications 10 are allocated across a number of application services 20. Applications 10 can be any software that can be housed in a cloud environment, including web applications, or application programming interfaces (APIs). Application services 20 can comprise an engine or hardware/software combination capable of hosting an application 10 by providing the necessary computational, memory, storage, and/or network resources. Examples of common application service types are web servers, such as Apache Tomcat, and database systems, such as MySQL. Optionally, application services 20 can be configured to run within containers 30, such as containers as managed by the Docker or Kubernetes (K8s) platforms. Containers 30 can provide pre-configured environments that can further abstract application services 20 from virtual machines 40.

Virtual machines 40 are emulations of computer systems. Each virtual machine 40 can generally exhibit the behavior of a single physical computer, though the virtual machine 40 can be running across many physical computers, or nodes, and multiple virtual machines might be present on a single physical node. A cluster of virtual machines can form a "cloud," which can be controlled by one or more hypervisors 50, which in turn can initiate and control one or more virtual machines. Example virtualization packages that can include aspects of both virtual machines 40 and hypervisors 50 are the OpenStack platform, the Xen platform, the VMware ESX platform, or kernel-based virtual machines (KVMs). While only one cloud with a single hypervisor 50 is depicted in the example of FIG. 1, multiple hypervisors can be supported across multiple clouds. Similarly, any number of applications 10, application service providers 20, containers 30, or virtual machines 40 can be supported by each hypervisor 50.

Conceptually, cloud infrastructures that are supported by the resource allocation system of the present disclosure can be organized into hierarchical structures, such as trees or other directed graphs. In the example depicted in FIG. 1 the various providers are arranged in levels of a tree. Each provider therefore offers some service to one or more children at a higher level. In addition, each provider except for the hypervisor 50 at the root of the tree consumes a service from one or more parents at a lower level. In the provided example, therefore, application services 20 are leaf providers, and hypervisor 50 is a root provider. The hierarchy depicted in FIG. 1 is provided by way of example; this concept can be applied to other cloud infrastructures that include different numbers of levels and/or types of service providers.

Figure 2:
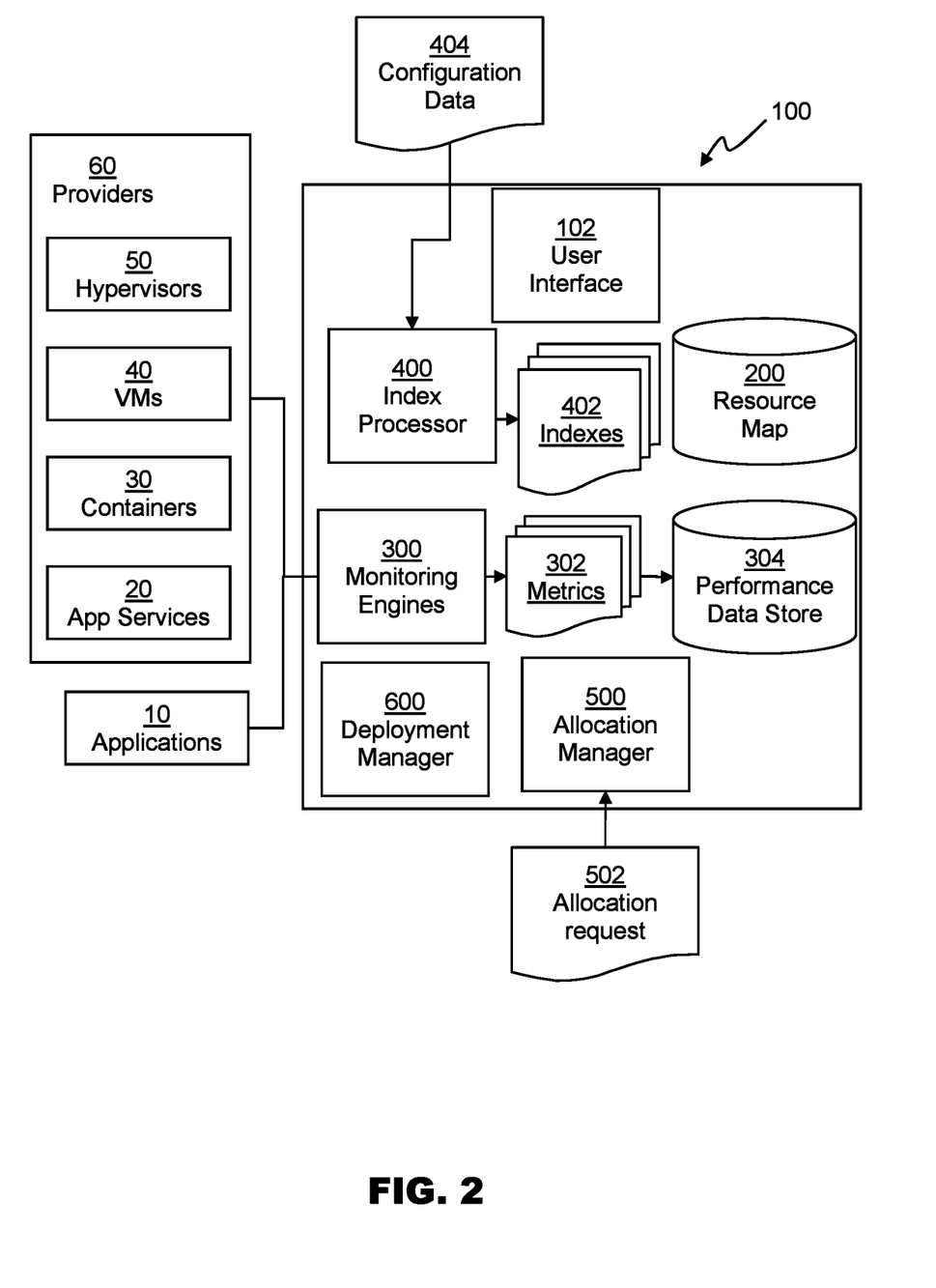
FIG. 2 is a block diagram depicting components of a resource allocation system, according to an embodiment.

FIG. 2 is a block diagram depicting a schematic view of a resource allocation system 100, according to an embodiment.

User interface 102 can receive user inputs and provide user outputs regarding configuration of resource allocation system 100 and status of cloud infrastructure 1. User interface 102 can comprise a mobile application, web-based application, or any other executable application framework. User interface 102 can reside on, be presented on, or be accessed by any computing devices capable of communicating with the various components of system 100, receiving user input, and presenting output to the user. In embodiments, user interface 102 can reside or be presented on a smartphone, a tablet computer, laptop computer, or desktop computer.

Resource map 200 can comprise a configuration management system (CMS) database, or other data store capable of storing a representation of cloud infrastructure 1 including the relevant parent and child hierarchical relationships. In embodiments, resource map 200 can further store intended, suggested, or optimal arrangements of cloud infrastructure 1. Resource map 200 can be presented to a user via user interface 102.

Monitoring engines 300 can comprise a plurality of logging systems, sensors, message queues, or other components capable of tracking metrics from providers 60 at each level of cloud infrastructure 1 and from applications 10. A variety of monitoring engines 300 can be provided at each level of cloud infrastructure 1, and each monitoring engine 300 can be specialized to monitor a specific provider type. Monitoring engines 300 can provide performance data, including metrics 302 to performance data store 304. In embodiments, performance data store 304 can be a database system, such as a Cassandra database system, though other performance data storage systems can be used. In an embodiment, monitoring engines 300 can communicate with performance data store 304 by writing data to a message queue, such as an Apache ActiveMQ message broker queue. Performance data store 304 can further comprise a queue monitoring component to read and serialize performance data from the message queue. Performance data can comprise one or more metrics, or measures of performance and/or utilization of the resources of each provider. The metrics available can be level or provider-specific. Metrics can be provided to the user through user interface 102, in embodiments. For example, user interface 102 can provide dashboard screens and or reports of current, historical, and projected metrics data.

Monitoring engines 300 for hypervisors 50 can comprise OpenStack Ceilometers, Prometheus toolkit instances, or other metrics gathering components known in the art. Hypervisor level metrics can comprise measurements including system load, number of active hypervisor tasks, number of hypervisors, number of running virtual machines, number of available CPUs, free hard drive space, and free RAM space. Hypervisor level metrics can also comprise metrics relating to the physical computing systems under the hypervisor's management. These can include measurements of CPU, RAM, and hard drive utilization, network connectivity, temperature, fan speed, or other indications of system help. Virtual machine level metrics can comprise information regarding the available CPU, memory, and disk space provided to each virtual machine, as well as average peak transaction throughput and/or response time. Container level metrics can comprise CPU utilization or other metrics provided by the container platform.

At the application services level, metrics can be specialized for the specific application service provided. For example, a database system can use metrics such as batch requests per second, and transactions per section as well as CPU and memory utilization metrics. Similarly, a web server can use metrics such as thread count, request data size, and processing time.

At the application level, metrics can be customized for each business requirement that the application is indented to fulfill. For example, if the application provides searching functionality, metrics can include the number of search requests received or completed per second. A data storage application can include metrics related to data throughput, such as the number of files or amount of data moved per second.

Figure 3A:
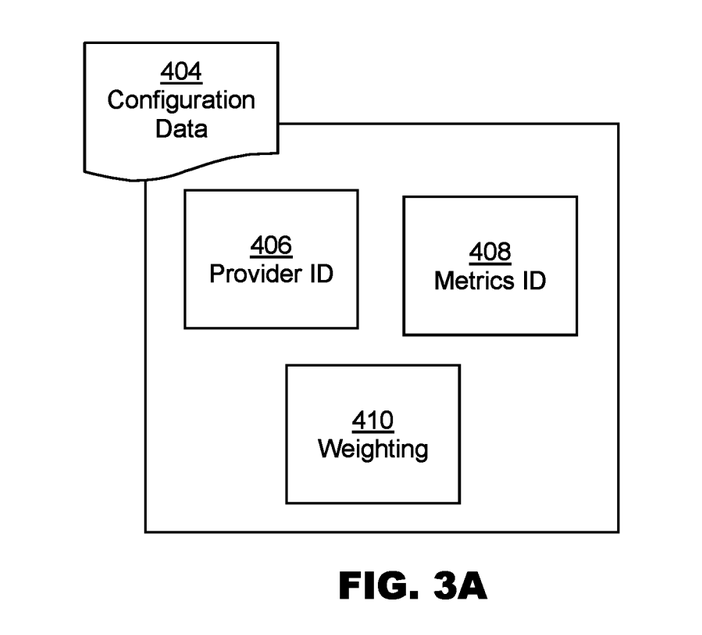
FIG. 3A is a block diagram depicting data elements of a configuration element, according to an embodiment.

Index processor 400 can use metrics 302 to calculate an optimization index 402 for each provider. Index processor 400 can receive configuration data 404 which can comprise provider-specific optimization index weightings. As depicted in FIG. 3A, each configuration data 404 record can associate a provider identifier 406, with one or more metrics identifiers 408, and (in embodiments) weightings 410 for use in determining the optimization index. Each optimization index 402 can be scaled to a value between zero and one, based on the weightings 410. Configuration data 404 can comprise a single entry for multiple providers 60 of the same type, or individual entries for each provider 60. Configuration data 404 can be directly incorporated into index processor 400, or can be received as user input via a user interface, or one or more configuration files.

In embodiments, an optimization index 402 for each provider 60 can be calculated as the average of the ratio between current and peak values for the metrics identifiers 408 for the provider. In other words, if configuration data 404 lists metrics $m_1 \ldots m_n$ for a provider 60, the optimization index for a provider 60 can be calculated via the following formula:

$$OI_{provider} = \frac{\sum_{i=1}^{n} \frac{m_i \text{current}}{m_i \text{peak}}}{n}$$

Metrics that can be used to determine an optimization index 402 for a hypervisor 50 include percentages of physical CPU utilization, physical disk utilization, and physical memory utilization across the physical systems under management by the hypervisor. Metrics that can be used to determine an optimization index 402 for a virtual machine 40 or a container 30 include percentages of virtual CPU utilization, virtual disk and virtual memory utilization. Virtual machine metrics can also include throughput and response time. Metrics that can be used to determine an optimization index 402 for an application service provider 20 can include thread count, request size, requests per second, and processing time. In embodiments, more, fewer, or alternative metrics can be used.

In embodiments, more complex calculations of optimization 402 can be performed. As an example, a hypervisor provider optimization index 402 can be calculated based on the utilization percentages of the physical CPU, physical disk, and physical memory across the physical systems under management by the hypervisor. Configuration data 404 can therefore specify equal weightings 410, for each metric 408, and optimization index 402 can be calculated using:

$OI_{HV}$=Physical CPU Utilization %×Physical Disk Utilization %×Physical Memory Utilization %

A virtual machine provider optimization index 402 can be calculated based on the utilization percentages of the virtual CPU, virtual disk, and virtual memory available to the virtual machine, as well as average over peak throughput, and response time. Configuration data 404 can therefore specify equal weightings 410, for each metric 408, and optimization index 402 can be calculated using:

$$OI_{VM} = \text{CPU \%} \times \text{Disk \%} \times \text{Memory \%} \times \frac{\text{Avg. Response Time}}{\text{Peak Response Time}} \times \frac{\text{Avg. Transaction Throughput}}{\text{Peak Transaction Throughput}}$$

In some situations, an optimization index can be calculated based on the number of nodes in use by a provider. For example, a container optimization index 402 can be calculated based on an average, across n nodes, of the CPU utilization of each node and the memory utilization of each node using the following equation:

$$OI_{CON} = \frac{\sum_n^1 \text{CPU \%} \times \sum_n^1 \text{Memory \%}}{n}$$

At higher cloud infrastructure levels, the optimization index 402 can be calculated based on the optimization index of the ancestor providers. For example, an application service layer provider such as a database system can have an optimization index calculated based on the host virtual machine, as well as database system-specific metrics, such as:

$$OI_{DB} = OI_{VM} \times \frac{\text{Avg. Batch Requests/second}}{\text{Peak Batch Requests/second}}$$

A web server application service can have an optimization index 402 calculated based on an equation such as:

$$OI_{WEB} = \frac{\text{Current thread count}}{\text{Max thread count}} \times \frac{\text{Avg. Request Size}}{\text{Peak Request Size}} \times \frac{\text{Avg. Processing Time}}{\text{Peak Processing Time}}$$

In embodiments, each optimization index 402 can be calculated at regular intervals, when new metrics 302 are available, only on request, or at any other time. Optimization indexes 402 can be associated with each provider in resource map 200 for retrieval. In embodiments, optimization indexes 402 can be presented to a user via user interface 102.

Figure 3B:
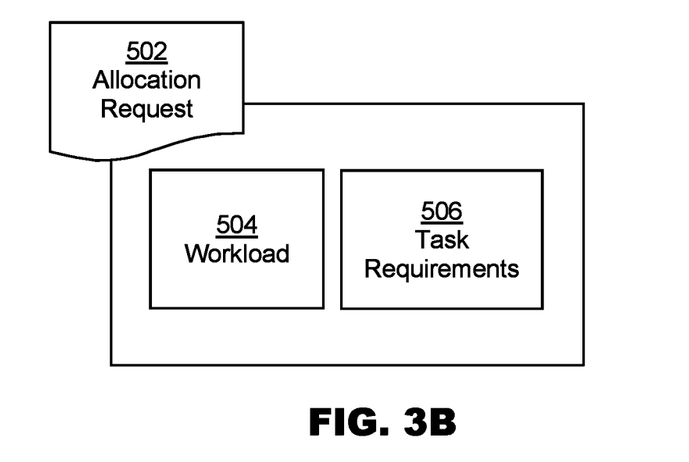
FIG. 3B is a block diagram depicting data elements of an allocation request, according to an embodiment.

Allocation manager 500 can receive allocation requests 502. FIG. 3B is a block diagram depicting an allocation request, according to an embodiment. Allocation requests 502 can comprise a workload 504, which can reference an instance of an application 10 or provider 60 to be executed. Allocation requests 502 can further comprise task requirements 506, which can comprise minimum service requirements for the workload. In embodiments, requested task requirements 506 can be static for each workload 504, such as those defined by service level agreements or other performance requirements. In embodiments, task requirements 506 can also be dynamically determined based on the actual metrics data 302 held in performance data store 304. For example, an initial allocation request 502 for an application 10 can comprise task requirements 506 received from application developers. Further allocation requests 502 for the same application 10 can comprise task requirements 506 based on the actual peak load over a time period.

Allocation manager 500 can update resource map 200 with a desired assignment of each workload 504 to a potential provider 60. A potential provider is a provider 60 that is capable of hosting the workload 504. A potential provider for an application 10 is generally an application service provider 20. A potential provider of a provider 60 is a provider at the parent level of the tree in the resource map 200.

Deployment manager 600 can be in data communication with providers 60 to instruct providers to execute one or more allocated workloads, based on a desired arrangement. Deployment manager 600 can comprise one or more data communication interfaces. Data communication interfaces can include wired connections such as Ethernet connections, Universal Serial Bus (USB), and the like; wireless connections such as WiFi, Bluetooth, Zwave, ZigBee, I2C, and the like; and/or other communication interfaces or protocols enabling data communication between deployment manger 600 and providers 60.

Figure 4:
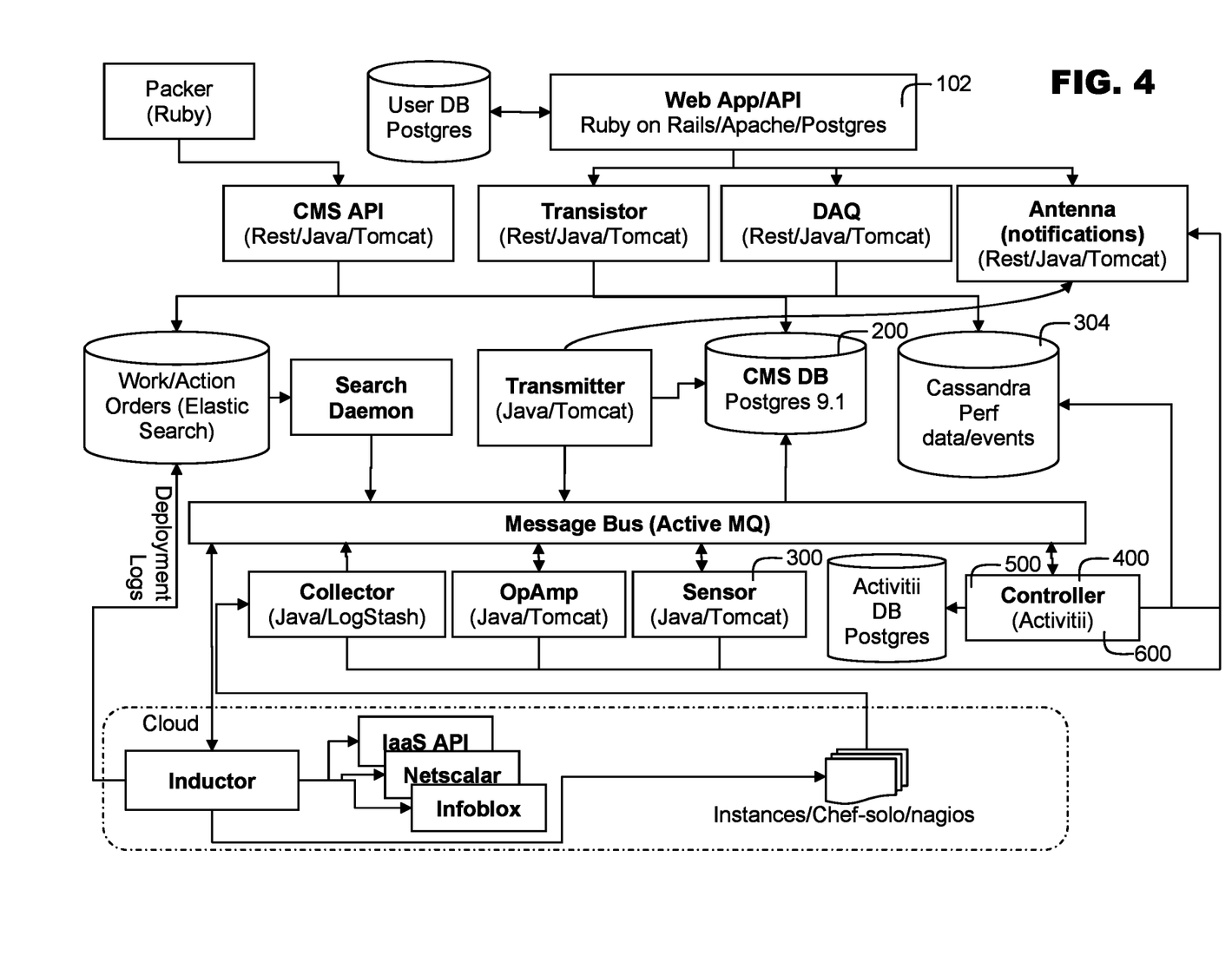
FIG. 4 is a block diagram depicting components resource allocation system, according to an embodiment.

It will be appreciated that the various components of system 100 can be integrated into existing cloud application orchestration systems, such as the OneOps® cloud management and application lifecycle management platform, in one example embodiment. FIG. 4 is a block diagram depicting a schematic view of an example OneOps® architecture, including components of an embodiment of system 100.

Those of ordinary skill in the art will appreciate that OneOps® comprises a web application front end, implemented in Ruby-on-Rails, Apache, and Postgres. User interface 102 can be provided within the existing web application front end. Resource map 200 can comprise, or receive data from, the OneOps® CMS database, which is configured to record all OneOps® assemblies, environments, and deployments. Similarly, performance data store 304 can comprise or receive data from the OneOps® Perfdata database. Monitoring engines 300 can comprise or leverage the OneOps® java/Tomcat Sensor components.

Control functionality for allocating workloads in OneOps® is generally provided through an Activiti controller. Activiti is a workflow engine that can execute business processes described in a business process model and notation (BPMN) language. Both index processor 400 and allocation manager 500 can be implemented in BPMN for execution by the OneOps® activity controller.

Figure 5:
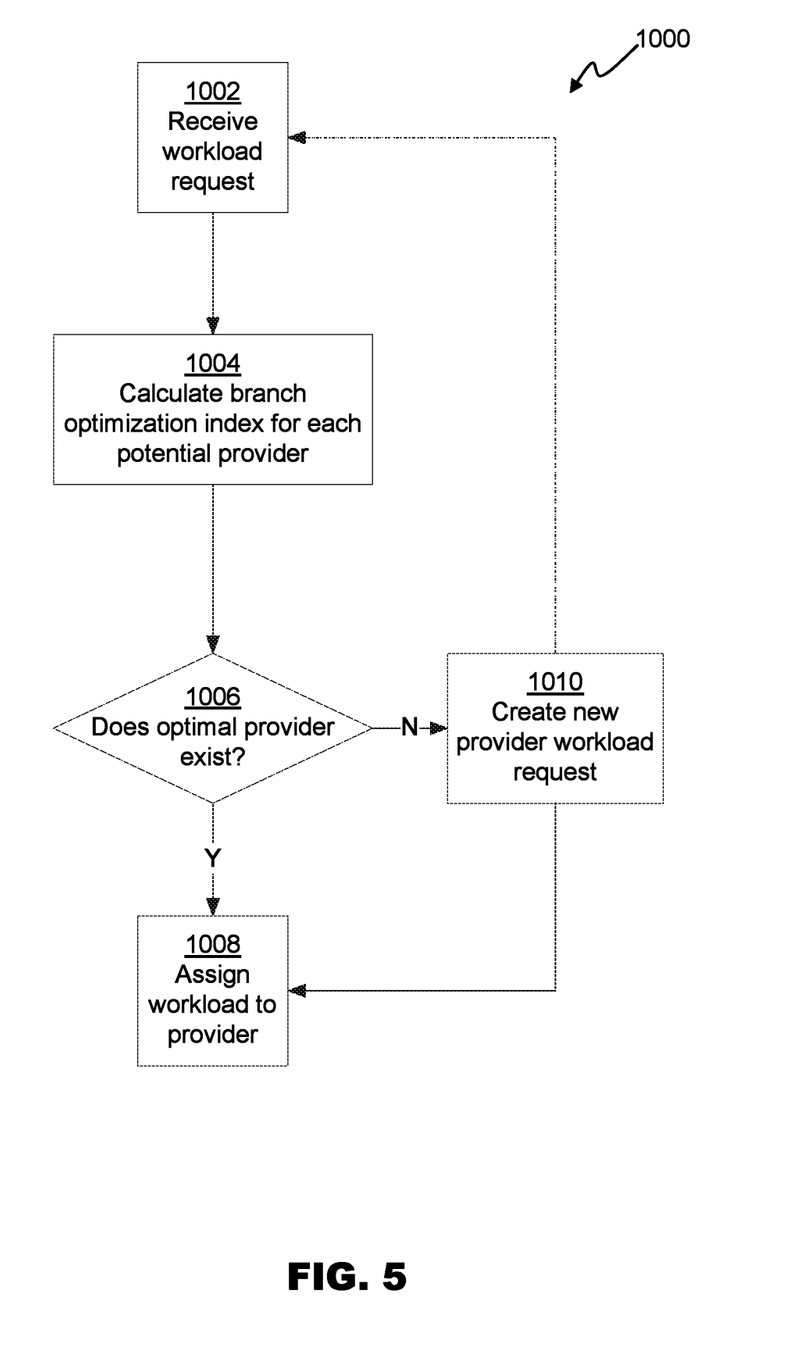
FIG. 5 is a flowchart depicting a resource allocation method, according to an embodiment.

In operation, resource allocation system 100 can enable more efficient provisioning of cloud infrastructure resources by minimizing overprovisioning. FIG. 5 is a flowchart depicting a resource allocation method 1000, according to an embodiment. At 1002, a workload request can be received. At 1004, the optimization index for each potential provider for the workload can be calculated. At 1006, the optimization indexes can be reviewed to determine if an appropriate provider exists. In one embodiment, a provider can be deemed appropriate, or "optimal," if adding the workload to the provider is likely to move the optimization index 402 of the provider to a threshold value, for example 70%, while not exceeding any maximum thresholds of the provider. Different criteria can be used in embodiments.

If there is an optimal provider, the workload can be assigned at 1008. If not, a new provider workload request can be generated at 1010, and method 1000 can be performed to determine the optimal parent provider for the newly generated provider. Control can then return to 1008, and the original workload can be assigned to the new provider.

The iterative nature of method 1000 can enable efficient traversal of cloud infrastructure 1. In addition, because existing resources are searched first, additional resources need only be provisioned when justified by the overall system load.

When optimization indexes are continually updated, allocation manager 500 can periodically review the optimization indexes 402 and determine optimized reorganization patterns. Allocation manager 500 can attempt to optimize for maximum utilization of all available providers, or an even distribution of optimization providers, or use other optimization goals. Optimization goals can be received from the user, through user interface 102, or configuration data 404.

Figure 6:
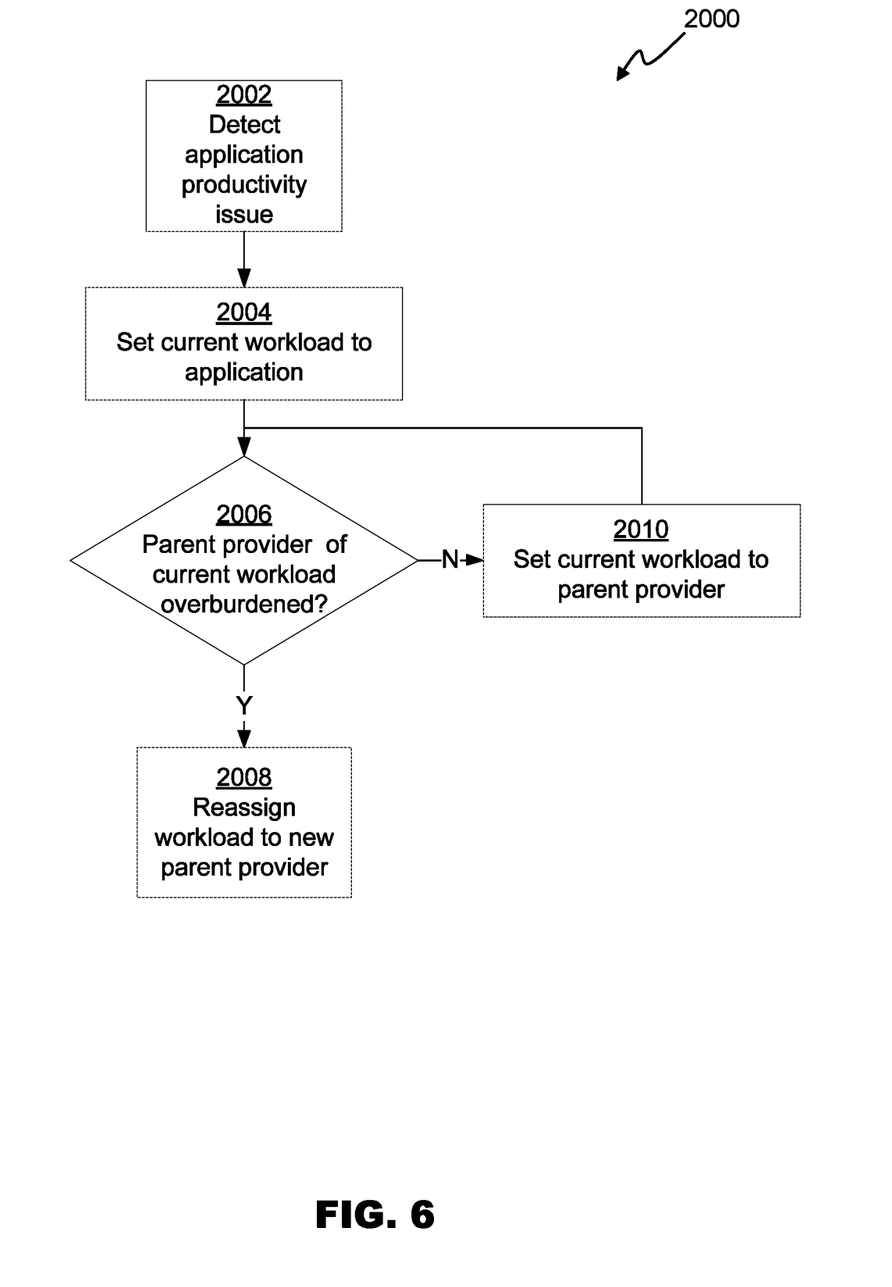
FIG. 6 is a flowchart depicting a resource allocation method, according to an embodiment.

FIG. 6 is a flowchart depicting a method for resolving workload productivity issues, according to an embodiment. At 2002, a workload productivity issue can be detected. Issues can be detected based on user indication of poor performance, application metrics, and/or provider metrics.

In embodiments issues can be detected based on a workload optimization index which can be calculated based on performance data provided by each ancestor provider in cloud infrastructure 1. For example, a workload optimization index could be calculated as the sum of the average optimization index of the providers at each level of cloud infrastructure 1 that is used by the workload.

Issues can also be monitored on a level-by-level basis. For example, instead of a single workload optimization index discussed above, the average optimization index of the providers at each level that is used by the workload can be considered separately. This can enable more precise drilling down to the level where the opportunity for efficiency gains exists.

Transition costs incurred by reorganizing workloads through cloud infrastructure 1 can be reduced by waiting until the performance data indicates an index that is outside of a desirable range for a timeout period. The timeout period can be hardcoded, or received from the user.

At 2004, a current workload value can be assigned to the workload with the detected productivity issue. Beginning at 2006, an iterative search of the current branch of cloud infrastructure 1 can be performed. At 2006, the optimization index, or some other metric of the parent provider of the current workload, can be compared against thresholds to determine if the parent provider is overburdened. For example, a provider can be overburdened if the optimization index of the provider is greater than 70%, although other thresholds can be used. If the parent provider is overburdened, the current workload can be allocated to a different parent at 2008, for example, by executing method 1000, discussed above. In embodiments, the search for a different parent can favor moves that result in the fewest changes to the ancestor tree of the workload. For example, a search for a new application service provider 20 (parent) for an application 10 can look for potential parents (application service providers) that share a parent (virtual machine 40) with the current parent (application service provider 20) first, such that the grandparent (virtual machine 40) of the current workload will only change if necessary.

If the parent provider is not overburdened, the search can continue by setting the current workload to the parent provider at 2010, before returning control to 2004. The iterative nature of method 2000 enables automatic reorganization of workloads while saving minimizing costs in time and bandwidth for moving providers.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Various publicly available systems and tools are provided herein as examples for use by and with embodiments of the present disclosure. All trademarks and registered trademarks appearing herein are the property of their respective owners. Apache Tomcat, the Cassandra database system, and ActiveMQ are developed and provided by the Apache Software Foundation. MySQL is developed and provided by Oracle Corporation. Docker is developed and provided by Docker, Inc. Kubernetes and Prometheus are developed and provided by the Cloud Native Computing Foundation (CNCF). OpenStack is managed by the OpenStack Foundation, Xen is developed and provided by the Linux Foundation, VMware is developed and provided by VMware, Cassandra is developed and provided by the Apache Software Foundation. OneOps® is developed and provided by Walmart, Inc, OneOps® is a registered trademark of Walmart Apollo, LLC. Ruby-on-Rails is developed and provided by David Heinemeier Hansson. Postgres and PostgreSQL are developed and provided by the PostgreSQL Global Development Group. Activitii is developed and provided by Alfresco.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A resource allocation system for managing execution of a computing task by a hierarchically-arranged computing infrastructure comprising a plurality of levels including a root level and a leaf level, each level comprising one or more service providers, each non-root level service provider configured to consume a service provided by a parent service provider, and each leaf level service provider controllable to execute the computing task, the resource allocation system comprising:
   a resource map comprising data elements associated with each service provider of the one or more service providers, such that one or more ancestor service providers forming an ancestor tree can be identified for each of the non-root level service providers;
   an index processor configured to calculate an optimization index for each non-root level service provider and store the calculated optimization indexes in the resource map in association with the corresponding data elements, the optimization index for a selected service provider based on a plurality of level-specific performance metrics received from one or more monitoring engines in data communication with the selected service provider and an aggregate of the optimization indexes of the one or more ancestor service providers of the selected service provider, the optimization indexes of the one or more ancestor service providers previously calculated based on a plurality of level-specific performance metrics for a respective ancestor service provider in the ancestor tree multiplied by an aggregate of the optimization indexes of one or more ancestor service providers to the respective ancestor service provider in the ancestor tree; and
   an allocation manager configured to identify a leaf level service provider for execution of the computing task based on one or more task requirements and the resource map such that the optimization index for each leaf element is as close as possible to a target index value.

2. The system of claim 1, further comprising a deployment manager configured to control each leaf level service provider to execute one or more computing tasks based on the identified leaf level service providers of a plurality of computing tasks.

3. The system of claim 1, wherein the allocation manager is further configured to create a new leaf level service provider for the computing task if no suitable leaf level service provider exists.

4. The system of claim 1, wherein the index processor is further configured to periodically recalculate the optimization indexes.

5. The system of claim 4, wherein the allocation manager is configured to identify a replacement leaf level service provider for execution of the computing task by:
   identifying one or more suitable replacement leaf level service providers and selecting the suitable replacement leaf level service provider of the one or more suitable replacement leaf level service providers resulting in a minimum number of changes to an ancestor tree of the identified leaf level service provider.

6. The system of claim 1, wherein the one or more monitoring engines comprise data connectors configured to store the plurality of level-specific performance metrics in a common metrics data store.

7. A method for allocating resources for execution of a computing task by a hierarchically-arranged computing infrastructure comprising a plurality of levels including a root level and a leaf level, each level comprising one or more service providers, each non-root level service provider configured to consume a service provided by a parent service provider, and each leaf level service provider controllable to execute the computing task, the method comprising:
   storing a resource map comprising data elements associated with each service provider of the one or more service providers, such that one or more ancestor service providers forming an ancestor tree can be identified for each of the non-root level service providers;
   calculating an optimization index for each non-root level service provider, the optimization index for a selected service provider based on a plurality of level-specific performance metrics received from one or more monitoring engines in data communication with the selected service provider and an aggregate of the optimization indexes of one of the one or more ancestor service providers of the service provider, the optimization indexes of the one or more ancestor service providers previously calculated based on a plurality of level-specific performance metrics for a respective ancestor service provider in the ancestor tree multiplied by an aggregate of the optimization indexes of one or more ancestor service providers to the respective ancestor service provider in the ancestor tree;

storing the calculated optimization indexes in the resource map in association with the corresponding data elements; and identifying a leaf level service provider for execution of the computing task based on one or more task requirements and the resource map such that the optimization index for each leaf element is as close as possible to a target index value.

8. The method of claim 7, further comprising controlling each leaf level service provider to execute one or more computing tasks based on the identified leaf level service providers of a plurality of computing tasks.

9. The method of claim 7, further comprising creating a new leaf level service provider for the computing task if no suitable leaf level service provider exists.

10. The method of claim 7, further comprising periodically recalculating the optimization indexes and branch indexes.

11. The method of claim 10, further comprising identifying a replacement leaf level service provider for execution of the computing task by:

identifying one or more suitable replacement leaf level service providers and selecting the suitable replacement leaf level service provider of the one or more suitable replacement leaf level service providers resulting in a minimum number of changes to an ancestor tree of the identified leaf level service provider.

12. The method of claim 7, further comprising storing the plurality of level-specific performance metrics in a common metrics data store.

* * * * *